Patented Nov. 5, 1929

1,734,278

UNITED STATES PATENT OFFICE

JOHN GUDBRAND TANDBERG, OF LUND, SWEDEN, ASSIGNOR, BY MESNE ASSIGNMENTS, TO ELECTROLUX SERVEL, A CORPORATION OF DELAWARE

REFRIGERANT

No Drawing.    Application filed October 1, 1925, Serial No. 59,965, and in Sweden July 7, 1925.

In refrigerators of the absorption type, in a certain part of the cooling system a cooling agent, for instance ammonia, is brought into contact with an absorption agent, for instance water, in which said cooling agent is rapidly dissolved. In another part of the cooling system the cooling agent is then driven out, for instance by heat.

The present invention refers to refrigerating apparatus of this kind and particularly to refrigerators of the kind which contain an auxiliary agent adapted to pass through a closed cycle for the purpose of equalizing the pressure within the apparatus.

The principal object of the invention is to increase the efficiency of refrigerators of the kind referred to.

One object of the invention is to use as an absorption agent a liquid to which is added a suitable substance capable of increasing the absorbing property of said liquid for the cooling agent.

Another object of the invention is to use as an absorption agent a liquid in which a suitable substance is dissolved capable of increasing the capability of said liquid of dissolving the cooling agent.

Another object of the invention is to use as an absorption agent a liquid to which is added a suitable substance capable of decreasing the vapor tension of said liquid.

Still another object of the invention is to use as a cooling agent an amine, for instance methyl amine, in combination with a suitable liquid absorption agent for said amine.

Still further objects will appear from the following specification and finally pointed out in the appended claims.

In refrigerators of the kind set forth it is of great importance that the absorption agent be capable of dissolving the cooling agent in a rapid and complete manner. In order to provide an absorption agent which will satisfy this condition, a liquid absorption agent is used in which, according to the present invention, one or more suitable substances are dissolved, said substance or substances being capable of increasing the capability of the absorption liquid to dissolve the cooling agent.

In refrigerators heretofore known, the absorption agent, in most cases water, will partly evaporate on driving out the cooling agent, for instance ammonia, which causes a decrease of the cooling effect of the apparatus. In order to minimize this disadvantage, a suitable substance or substances may according to this invention be added to or dissolved in the absorption liquid, which substance or substances are capable of lowering the vapor tension of the absorption liquid so that, on driving out the cooling agent, a smaller quantity of vapor of the absorption liquid will be entrained by the vapor of the cooling agent.

In some cases it will be suitable to use a substance or substances having both the effects mentioned above, that is to say which will increase the capabilty of the absorption liquid to dissolve the cooling agent as well as to lower the vapor tension of the absorption liquid.

By adding one or more substances of the kind referred to not only the efficiency of the refrigerator is increased but a higher heat economy is also attained as the quantity of heat heretofore consumed for evaporation of the absorption liquid will be decreased or entirely avoided.

The following are examples of substances that have been found suitable for the purpose set forth: halides, acetates, formates, cyanates, sulpho-cyanates, cyanides, sulphates, nitrates, hydroxides or oxides of lithium, calcium, strontium, barium, aluminum, zinc, cadmium, nickel, cobalt, copper, chromium, titanium, thorium, zirconium, tin, silver or platinum.

It is questionable whether the marked character of these substances to increase the property of the absorption liquid of absorbing the cooling agent is due to the fact that they combine with the cooling agent or that the binding of the cooling agent is of a mere physical nature.

Good results have been obtained with a salt of calcium or with a salt of each of the metals calcium, barium and lithium.

Good results can also be attained by adding to the absorption liquid one or more halides of phosphorus, arsenic or antimony.

Heretofore, water has been almost exclusively used as an absorption liquid. However, it has been found that water can be preferably replaced by other liquids, for instance aliphatic or aromatic alcohols as glycerine, pyridine, methyl-alcohol, ethyl-alcohol, phenol or the like. By using such liquids as absorption agents a special addition of a substance or substances of the kind set forth above may in certain cases be unnecessary, but in other cases a suitable substance referred to is to be added to or dissolved in the absorption liquid, the quantity of the substance added varying according to the nature of the absorption liquid. Good results have especially been obtained with glycerine, with or without addition of water, in which may be dissolved one or more substances of the kind referred to above.

As a cooling agent ammonia is usually used. However, it has proved that several advantages can be gained by substituting an amine or amines for ammonia, especially methyl amine or a mixture of ammonia and the different methyl-amines. By this means the pressure in the whole apparatus may be decreased which, of course, is of advantage. In combination with a cooling agent consisting of such a derivative or derivatives of ammonia an absorption liquid of any kind may be used, but preferably a liquid is used to which is added one or more substances of the kind referred to above.

What I claim as new and desire to secure by Letters Patent of the United States of America is:—

1. In a refrigerator, an absorption agent for the cooling agent, consisting of a liquid in which a salt of each of the metals calcium, barium and lithium is dissolved.

2. In a refrigerator, an absorption agent for the cooling agent, consisting of an alcohol in which a salt is dissolved capable of increasing the capability of said alcohol of dissolving said cooling agent.

3. A group of substances for use in refrigeration comprising a methyl-amine as a cooling agent and an alcohol as a solvent therefor.

4. A group of substances for use in refrigeration comprising a methyl-amine as a cooling agent and an aliphatic alcohol as a solvent therefor.

5. A group of substances for use in refrigeration comprising a methyl-amine as a cooling agent and glycerine as a solvent therefor.

6. A group of substances for use in refrigeration comprising a mixture of ammonia and a methyl-amine as a cooling agent and an aqueous alcohol as a solvent therefor.

7. A group of substances for use in refrigeration comprising a methyl-amine as a cooling agent, an alcohol as a solvent therefor and a salt as a solute for lowering the vapor tension of the solvent.

8. A group of substances for use in refrigeration comprising a methyl-amine as a cooling agent, an alcohol as a solvent therefor and a chromate dissolved in the alcohol.

In testimony whereof I affix my signature.
JOHN GUDBRAND TANDBERG.